(12) United States Patent
You (10) Patent No.: US 12,345,358 B2
(45) Date of Patent: Jul. 1, 2025

(54) ANTI-TEARING HOOP

(71) Applicant: Yueqing Dongbo Electromechanical Co., Ltd., Zhejiang (CN)

(72) Inventor: Yixian You, Zhejiang (CN)

(73) Assignee: Yueqing Dongbo Electromechanical Co., Ltd., Zhejiang (CN)

( * ) Notice: Subject to any disclaimer, the term of this patent is extended or adjusted under 35 U.S.C. 154(b) by 0 days.

(21) Appl. No.: 18/402,109

(22) Filed: Jan. 2, 2024

(65) Prior Publication Data

US 2025/0035242 A1 Jan. 30, 2025

(30) Foreign Application Priority Data

Jul. 24, 2023 (CN) .......................... 202310915113.3
Jul. 24, 2023 (CN) .......................... 202321954570.5

(51) Int. Cl.
*F16L 33/025* (2006.01)
*F16B 2/08* (2006.01)
*F16L 33/02* (2006.01)
*F16L 33/03* (2006.01)
*F16L 33/035* (2006.01)

(52) U.S. Cl.
CPC .............. *F16L 33/025* (2013.01); *F16B 2/08* (2013.01); *F16L 33/02* (2013.01); *F16L 33/03* (2013.01); *F16L 33/035* (2013.01); *Y10T 24/1457* (2015.01)

(58) Field of Classification Search
CPC ....... F16L 33/02; F16L 33/035; F16L 33/025; F16L 33/03; F16B 2/08; Y10T 24/1457
See application file for complete search history.

(56) References Cited

U.S. PATENT DOCUMENTS

| | | | | |
|---|---|---|---|---|
| 4,756,060 | A | * | 7/1988 | Ojima .................... F16L 33/025 |
| 5,138,746 | A | * | 8/1992 | Ojima .................... F16L 33/035 |
| 5,191,684 | A | * | 3/1993 | Kenwright ............. F16L 33/035 |
| 9,267,629 | B2 | * | 2/2016 | Miessmer ............... F16L 33/02 |
| 2003/0014846 | A1 | * | 1/2003 | Kim ........................ F16L 33/025 |
| 2019/0257452 | A1 | * | 8/2019 | Haensli ...................... F16B 2/08 |
| 2022/0154861 | A1 | * | 5/2022 | Widrig .................. F16L 33/025 |

FOREIGN PATENT DOCUMENTS

EP         1568895 B1 *  5/2008  ................. F16B 2/08

* cited by examiner

*Primary Examiner* — William S. Choi
(74) *Attorney, Agent, or Firm* — Cooper Legal Group, LLC (57) ABSTRACT

A hoop, includes a connecting section, a fixing section and a hooping section, the fixing section is provided with a first receiving hole and a second receiving hole; and the fixing section is provided with an arch structure, the joint of the arch structure and the fixing section is provided with an abutting interface, the abutting interface is arranged on the side edge of the arch structure departing from the hooping section; and the fixing section is provided with a convex strengthening structure at the corner of the abutting interface.

3 Claims, 7 Drawing Sheets

ANTI-TEARING HOOP

CROSS-REFERENCE TO RELATED APPLICATION

This application claims the priority benefits of China application No. 202310915113.3, filed on Jul. 24, 2023, and China application No. 202321954570.5, filed on Jul. 24, 2023. The entireties of China application No. 202310915113.3 and China application No. 202321954570.5 are hereby incorporated by reference herein and made a part of this specification.

TECHNICAL FIELD

The present application relates to the technical field of a hoop, in particular, to an anti-tearing hoop.

BACKGROUND ART

The hoop is a connecting device for connecting grooved pipe fittings, valves and pipeline fittings, which is used to fasten the hoop between the opposite joints.

In the prior art, a hoop generally includes a hooping belt, the hooping belt is curled and formed into a hoop body with a encircling area, and the hoop body is provided with a fastening section, the hoop body forms an overlapping section which includes an outer belt body and an inter belt body, the inter belt body is provided with a first snap-fit and a second snap-fit, the outer belt body is respectively provided with a first snap interface for inserting the first snap-fit and a second snap interface for inserting the second snap-fit; when the hoop is fixed, it is necessary to use a tool pliers to hoop the fastening section on the hoop body.

However, in the hooping process, the first snap-fit abuts against the inner side edge of the first snap interface, the second snap-fit abuts against the inner side edge of the second snap interface; and the stress at the side edge on the four corners of the first snap interface and the second snap interface is concentrated, so a crack is easily torn from the side edge at the four corners of the snap interface when the snap-fit abuts against the inner side edge of the snap interface; and then damages the hoop and affects use effect of the hoop.

SUMMARY

The aim of the present application is to provide a tearing hoop, which solves the problem that the hoop may be torn from the inner side edge of the snap interface when the hoop is fastened in the above related technologies.

The present application provides an anti-tearing hoop, which adopts the following technical solution:

An anti-tearing hoop, includes a hoop body, in which the hoop body includes a connecting section, a fixing section and a hooping section, the connecting section is provided with a first snap-hook and a second snap-hook, the fixing section is provided with a first receiving hole and a second receiving hole, which is configured to insert the first snap-hook and the second snap-hook, respectively; and the fixing section facing a side that the first receiving hole departing from the connecting section is provided with an arch structure, the joint of the arch structure and the fixing section is provided with an abutting interface, the abutting interface is arranged on the side edge of the arch structure departing from the hooping section; and the fixing section is provided with a convex strengthening structure at the corner of the abutting interface.

By adopting the above technical solution, in the use process of the hoop, firstly, the first snap-hook is inserted to the inner of the first receiving hole, the second snap-hook is inserted to the inner of the second receiving hole, and then the hooping section is hooped by tool pliers; and after the hooping section is hooped, the first snap-hook abuts against the inner side edge of the first receiving hole, the second snap-hook abuts against the inner side edge of the second receiving hole; and with the configuration of the arch structure, improving the structure strength of the first receiving hole, reducing a possibility of the tearing appeared when the first snap-hook and the first receiving hole abut against each other, thereby improving the tear resistance of the hoop; and while with the configuration of the convex strengthening structure, improving the structure strength of the joint between the fixing section and the arch structure, reducing a possibility of the tearing appeared in the position where the first receiving hole is close to the arch structure, and further improving the tear resistance of the hoop.

In an embodiment, the arch structure is a globular arch part, and a side of the globular arch part departing from the abutting interface is wrap-shaped.

By adopting the above technical solution, the arch structure is a globular arch part, and a side of the globular arch part departing from the abutting interface is wrap-shaped; and with the configuration, it is convenient for worker to process the arch structure.

In an embodiment, the abutting interface is an oblique opening.

By adopting the above technical solution, the abutting interface is an oblique opening, with the configuration, during the application of the anti-tearing hoop, which is convenient to insert the first snap-hook into the abutting interface and to abut against the abutting interface tightly, and while is convenient for workers to observe the abutting state of the first snap-hook; and which is also convenient to operate the first snap-hook when dismounting.

In an embodiment, the arch structure is a circular-arch part, a side edge of the circular-arch part closest to the hooping section is provided with a processing opening.

By adopting the above technical solution, when the fixing section is stamped by a stamping device, comparing to the single configuration of the abutting interface, the configuration of the processing opening can reduce a possibility of the changing of thickness in the position where the fixing section closest to the circular-arch part, thereby improving the structural strength of the hoop.

In an embodiment, the sides of the circular-arch part closest to and departing from the hooping section are both provided with narrowing notches.

By adopting the above technical solution, with the configuration of the narrowing notches, in the application process of the anti-tearing hoop, it is convenient for workers to observe the position of the first snap-hook and to insert the first snap-hook into the abutting interface and to abut against the abutting interface tightly, and while is also convenient to operate the first snap-hook when dismounting.

In an embodiment, the number of the convex strengthening structure is four, the four convex strengthening structures are respectively configured to the arch foots of the circular-arch part closest to the abutting interface and processing opening.

By adopting the above technical solution, the number and the position of the convex strengthening structure is configured, thereby improving the structural strength of the joint between the fixing section and the arch structure, and also reducing the possibility of the tearing appeared at the position where the first receiving hole closest to the arch structure, and further improving the tear resistance of the hoop.

In an embodiment, the number of the convex strengthening structure is four, the four arch foots of the circular-arch part are respectively located at the center of the four convex strengthening structures.

By adopting the above technical solution, during the hoop is fastened, the stress at the four corners of the first receiving hole is the most concentrating; and the convex strengthening structure is provided at the four corners of the first receiving hole, thereby reducing more accurately the stress at the four corners of the first receiving hole.

In an embodiment, the convex shape of the convex strengthening structure protruding from the fixing section is hemisphere.

By adopting the above technical solution, the convex shape of the convex strengthening structure is hemisphere, with the shape of the convex strengthening structure, during the hoop is fastened, which can reduce the stress at the inner four corners of the first receiving hole and the possibility of tearing appeared at the four corners of the inner side edge of the first receiving hole.

In an embodiment, the number of the convex strengthening structure is two, the two convex strengthening structures are respectively arranged on the both side edges of the first receiving hole connecting the arch foot, and the two convex strengthening structures extend in a strip shape along the length direction of the fixing section.

By adopting the above technical solution, when the strip convex strengthening structure is stamped, the number of the convex strengthening structure is two, thereby is convenient for the convex strengthening structure to be stamped, reducing the process time of the convex strengthening structure.

In an embodiment, the second receiving hole is provided with an arch structure and a convex strengthening structure which is the same as the structures of the first receiving hole.

By adopting the above technical solution, the second receiving hole is provided with an arch structure and a convex strengthening structure which is the same as the structure of the first receiving hole, thereby improving the tear resistance of the second receiving hole, and reducing the possibility of the tearing appeared between the second snap-hook and the second receiving hole during the hooping process of the hooping section.

In summary, the present application includes at least one of the following beneficial technical effects:
1. the arch structure and the convex strengthening structure are configured, improving the structural strengths of the first receiving hole and the joint of the fixing section and the arch structure, reducing a possibility of the tearing appeared when the first snap-hook and the first receiving hole abut against each other, thereby improving the tear resistance of the hoop;
2. by the configuration that the arch structure is a globular arch part and the abutting interface is an oblique opening, during the application process of the anti-tearing hoop, it is convenient to insert the first snap-hook into the abutting interface and to abut against the abutting interface tightly, and is convenient to observe the state of the first snap-hook, and is also convenient to operate the first snap-hook when dismounting;
3. by the configurations that the arch structure is a circular-arch part and narrowing notches, during the application process of the anti-tear hoop, it is convenient to observe the position of the first snap-hook, and is convenient to insert the first snap-hook into the abutting interface and to abut against, and while is also convenient to operate the first snap-hook when dismounting.

DETAILED DESCRIPTION

The present application is further described in detail below with reference to the drawings.

Embodiment 1

Figure 1:
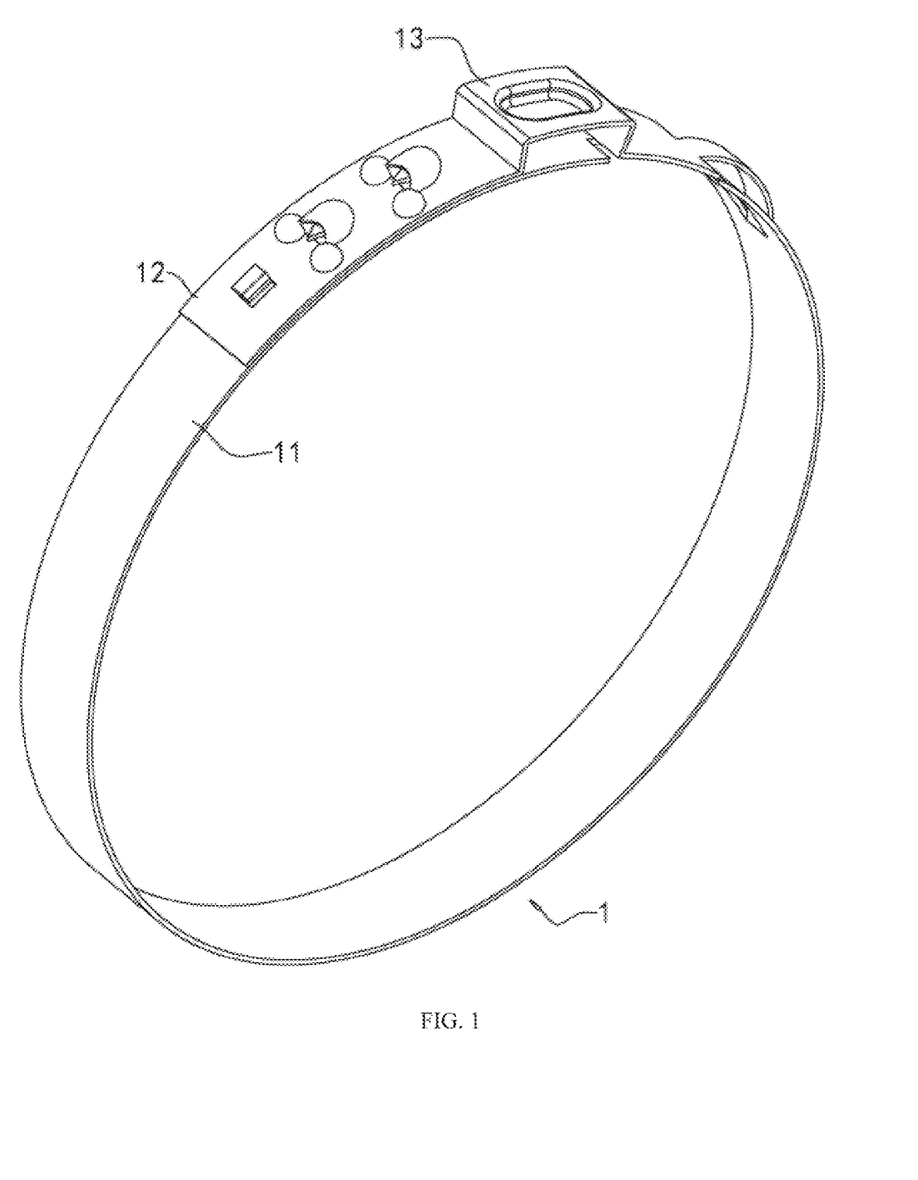
FIG. 1 is a schematic overall structure diagram according to Embodiment 1 of the present application.

Referring to FIG. 1, an anti-tearing hoop includes a hoop body 1; the hoop body 1 includes a connecting section 11, a fixing section 12 and a hooping section 13; and the connecting section 11, the fixing section 12 and the hooping section 13 are integrally formed.

Figure 2:
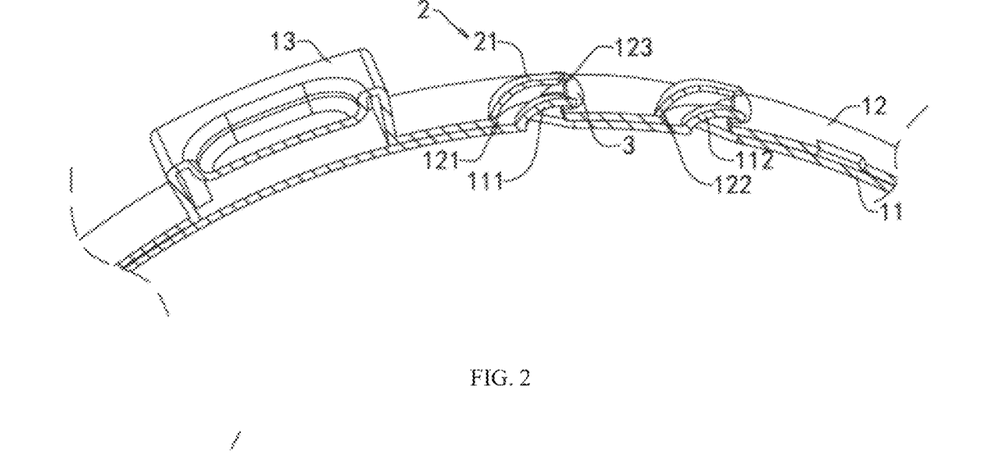
FIG. 2 is a schematic partial section view illustrating fitting of the first snap-hook with the first receiving hole according to Embodiment 1 of the present application.

Referring to FIG. 2, the connecting section 11 is provided with a first snap-hook 111 and a second snap-hook 112. The fixing section 12 is provided with a first receiving hole 121 for the first snap-hook 111 to be inserted into and abutted against, and is further provided with a second receiving hole 122 for the second snap-hook 112 to be inserted into. The distance between the first receiving hole 121 and the hooping section 13 is less than the distance between the second receiving hole 122 and the hooping section 13. The first snap-hook 111 and the second snap-hook 112 are both stamped by a stamping device.

Figure 3:
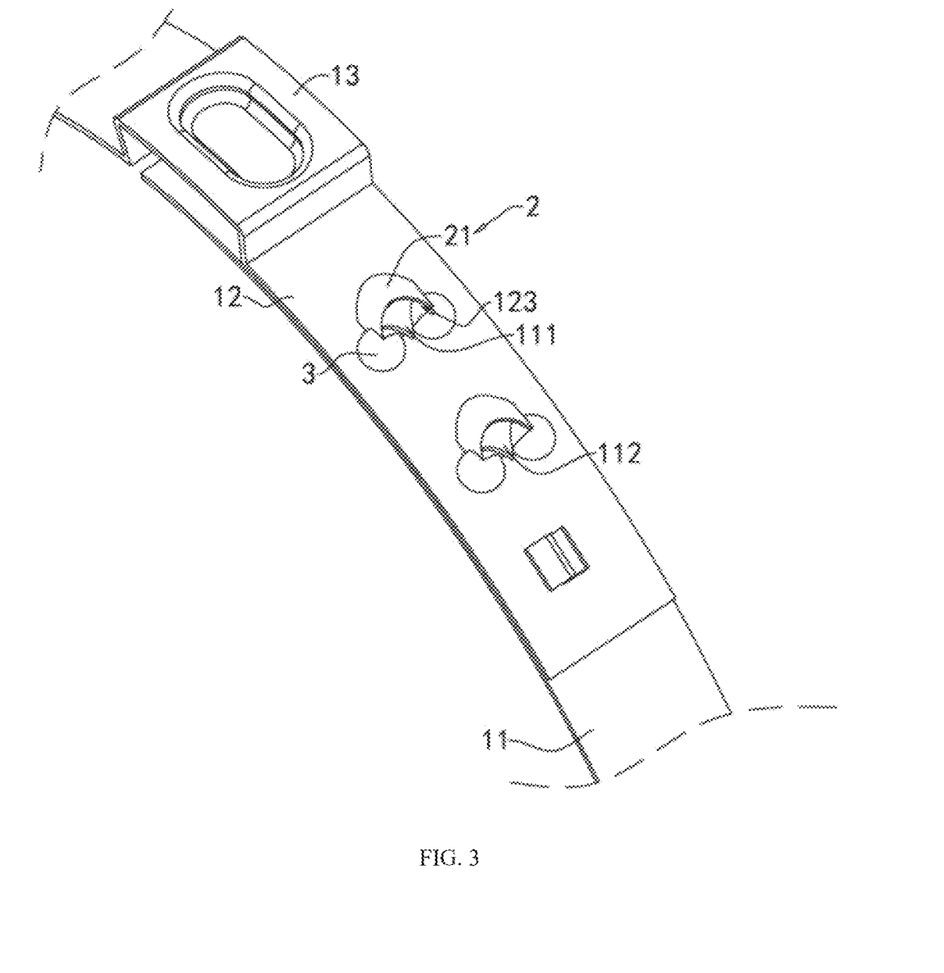
FIG. 3 is a schematic structure diagram illustrating the globular arch part according to Embodiment 1 of the present application.

Referring to FIG. 2 and FIG. 3, an arch structure 2 is provided on a side, facing away from the connecting section 11, of the fixing section 12 at the first receiving hole 121. An abutting interface 123 is provided at the joint of the arch structure 2 and the fixing section 12, and the abutting interface 123 is arranged on the side edge of the arch structure 2 away from the hooping section 13. A convex strengthening structure 3 is provided on the fixing section 12 at the corner of the abutting interface 123. The arch structure 2 and the convex strengthening structure 3 can be stamped by a stamping device; the first receiving hole 121 and the arch structure 2 are simultaneously stamped to be formed.

Referring to FIG. 2 and FIG. 3, the arch structure 2 is a globular arch part 21, and a side of the globular arch part 21 facing away from the abutting interface 123 is wrap-shaped, the profile shape of the globular arch part 21 is hemispherical cover-shape, which facilitates stamping the arch structure 2. The abutting interface 123 is an oblique opening. Such configuration can facilitate, during the application process of the anti-tearing hoop, observing the position of the first snap-hook 111 and inserting the first snap-hook 111 into the abutting interface 123 and abutting against tightly the abutting interface 123; and facilitate operating the first snap-hook 111 when dismounting.

Referring to FIG. 2 and FIG. 3, the number of the convex strengthening structure 3 is two. The two convex strengthening structures 3 are arranged on the corner of the first receiving hole 121. The convex strengthening structure 3 and the fixing section 12 are integrally formed. In addition, the convex strengthening structure 3 may also be separately formed by welding metal material onto the fixing section 12. The convex shape of the convex strengthening structure 3 protruding from the fixing section 12 is hemisphere, thereby more effectively reducing the stress at the position of inner corner of the first receiving hole 121 when the hoop is fastened. After the first snap-hook 111 abuts against the first receiving hole 121 tightly, the abutting portion between the first snap-hook 111 and the first receiving hole 121 is subjected to a great force when the hoop is fastened. However, the deformation of the fixing section 12 can result in stress concentration in the end of the gap, which is easy to appear the phenomenon of tearing. The convex strengthening structure 3 is configured in such a way that the stress at the joint of the first receiving hole 121 and the arch structure 2 is reduced when the hoop is fastened, and the possibility of tearing at the four corners of the first receiving hole 121 is reduced, thereby improving the tear resistance of the hoop.

Referring to FIG. 2 and FIG. 3, the second receiving hole 122 is provided with an arch structure 2 and a convex strengthening structure 3 with the same structures as that on the first receiving hole 121, thereby improving the tear resistance of the second receiving hole 122, and reducing the possibility that the second receiving hole 122 is tore by the second snap-hook 112 during the hooping process of the hooping section 13.

Figure 4:
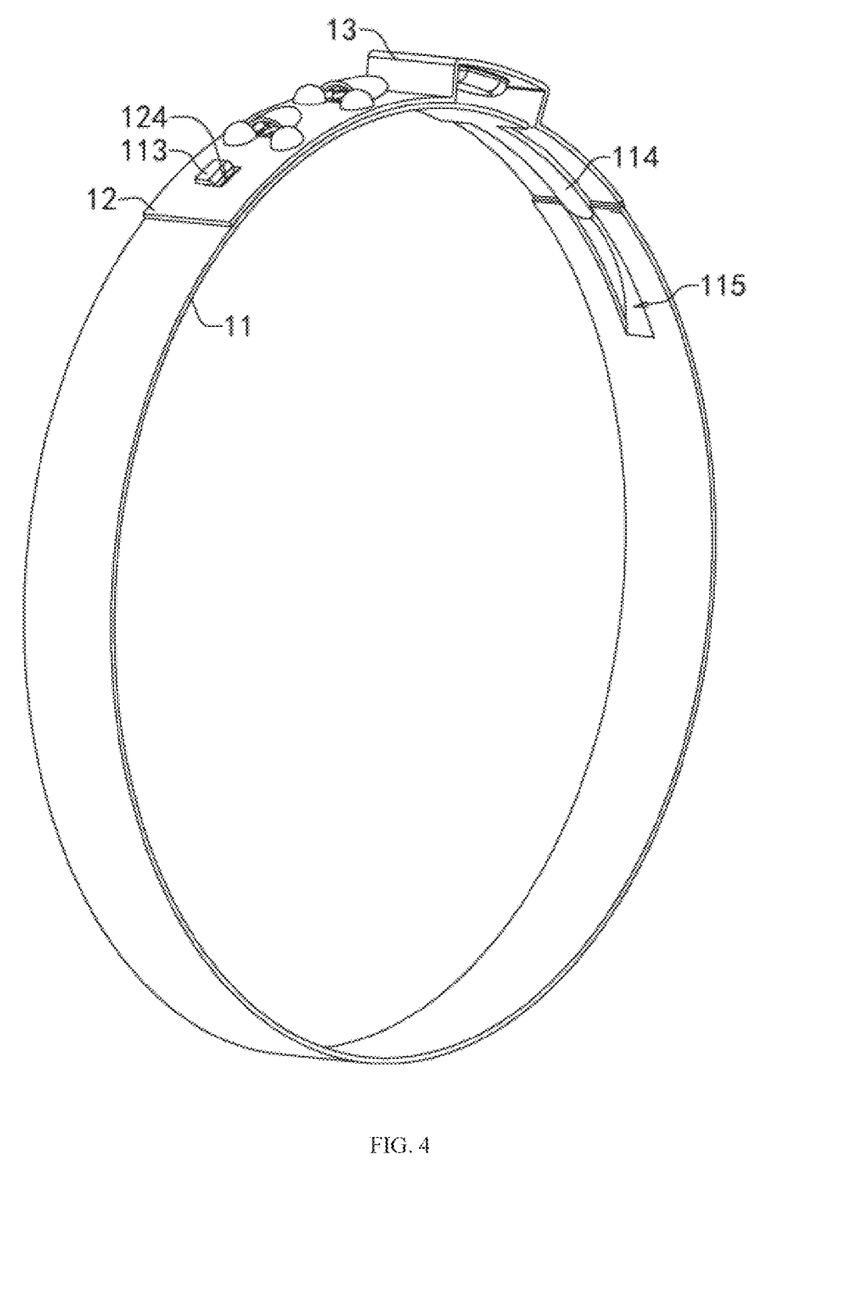
FIG. 4 is a schematic structure diagram illustrating the limiting strip inserting into the limiting slot according to Embodiment 1 of the present application.

Referring to FIG. 4, the connecting section 11 is provided with a fixing block 113 that is formed by stamping, and the fixing section 12 is provided with a fixing slot 124 for the fixing block 113 to insert and pass through. During the use process of the hoop, the fixing block 113 passes through the fixing slot 124 first, and then is bent by using a tool pliers, thereby avoiding the first snap-hook 111 (see FIG. 2) coming out of the first receiving hole 121, and avoiding the second snap-hook 112 (see FIG. 2) coming out of the second receiving hole 122.

Referring to FIG. 4, in the extended state, a limiting strip 114 is provided at an end of the connecting section 11 opposite to the hooping section 13, and a limiting slot 115 is provided on the inner wall of the connecting section 11 closest to the hooping section 13. In the bent state, the limiting strip 114 is inserted into the inner of the limiting slot 115, thereby reducing the possibility of deviation or dislocation of the hoop in the bent use state, and improving the stability of the hoop in use.

The implementation principle of the embodiment 1 in the present application is described as follows.

In the use of the hoop, firstly, the first snap-hook 111 is inserted into the inner of the first receiving hole 121, the second snap-hook 112 is inserted into the inner of the second receiving hole 122, the fixing block 113 passes through the fixing slot 124 and is bent, the limiting strip 114 is inserted into the inner of the limiting slot 115, and then the hooping section 13 is hooped tightly by tool pliers; after the hooping section 13 is hooped tightly, the first snap-hook 111 abuts against the inner side edge of the first receiving hole 121, the second snap-hook 112 abuts against the inner side edge of the second receiving hole 122; and the globular arch part 21 and the convex strengthening structure 3 are configured, thereby reducing the possibility of tearing between the first receiving hole 121 and the second receiving hole 122 in the abutting process, reducing the stress at the joints that the first receiving hole 121 and the second receiving hole 122 are respectively connected with the arch structure 2, and improving the tear resistance of the hoop.

Embodiment 2

Figure 5:
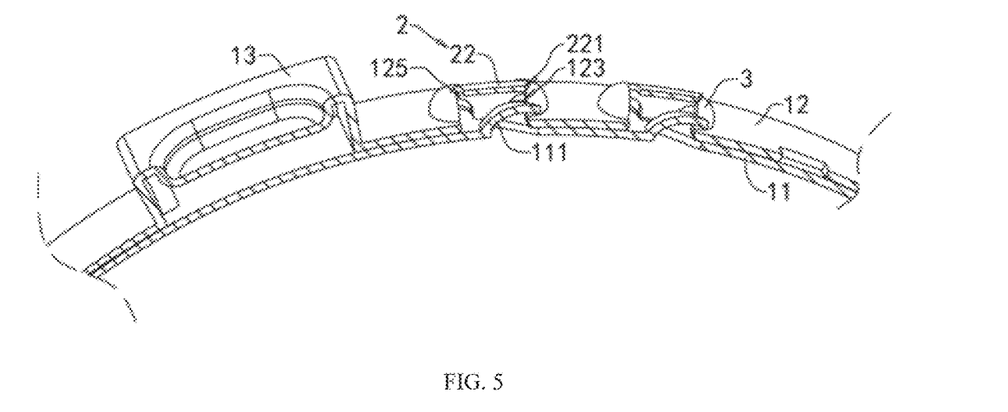
FIG. 5 is a schematic partial section view illustrating fitting of the first snap-hook with the first receiving hole according to Embodiment 2 of the present application.
Figure 6:
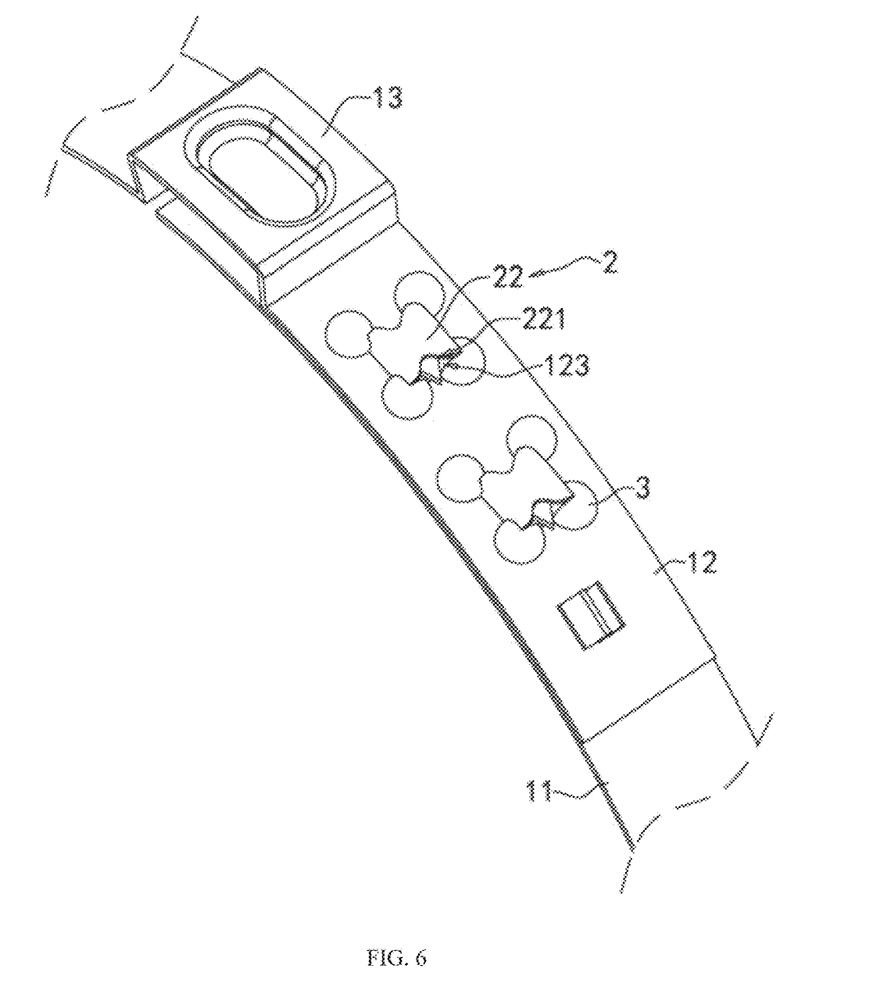
FIG. 6 is a schematic structure diagram illustrating the globular arch part according to Embodiment 2 of the present application.

Referring to FIG. 5 and FIG. 6, the embodiment 2 differs from the embodiment 1 is in that: the arch structure 2 is a circular-arch part 22, and a processing opening 125 is provided on the side edge of the circular-arch part 22 closest to the hooping section 13; and the fixing section 12 is stamped by a stamping device. Compared with the single configuration of the abutting interface 123, with the configuration of the processing opening 125, thereby reducing the possibility of the changing thinner in thickness at the position where the fixing section 12 closest to the circular-arch part 22, and improving the structural strength of the hoop. The both sides of the circular-arch part 22 closest to and departing from the hooping section 13 are provided with narrowing notches 221; with the configuration of the narrowing notches 221, during the application process of the anti-tearing hoop, which facilitates to observe the position of the first snap-hook 111, and to insert the first snap-hook 111 into the abutting interface 123 and to abut against tightly the abutting interface 123; and when dismounting, which facilitates to operate the first snap-hook 111.

Referring to FIG. 5 and FIG. 6, the number of the convex strengthening structure 3 is four. The four convex strengthening structures 3 are respectively arranged at the arch foots of the circular-arch part 22 closest to the abutting interface 123 and processing opening 125. In addition, in another embodiment, the arch structure 2 can be also a pointed arch, namely the outer surface of the arch structure 2 is an intersecting corner surface, which is not described here.

Embodiment 3

Figure 7:
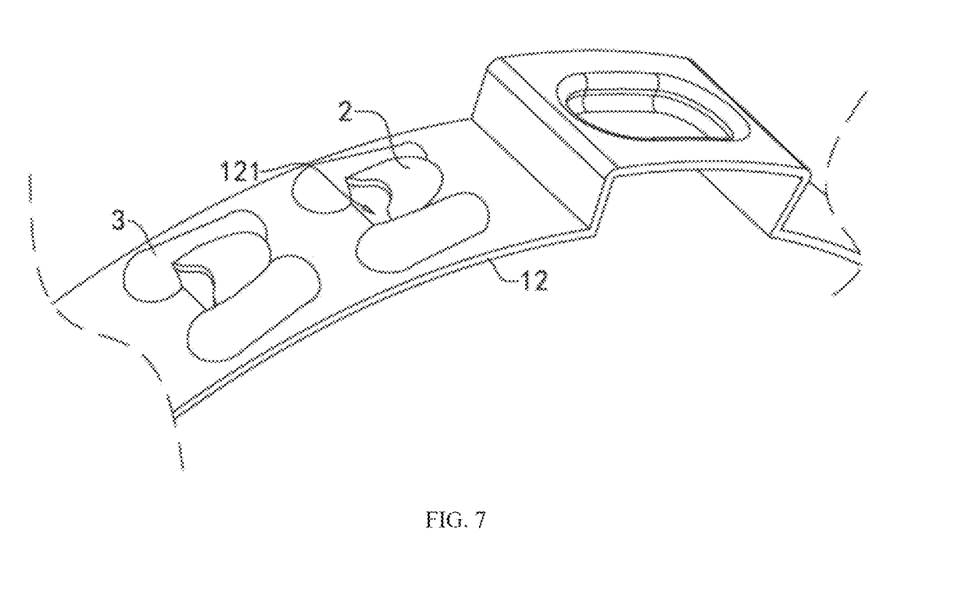
FIG. 7 is a schematic structure diagram illustrating the convex strengthening structure according to Embodiment 3 of the present application.

Referring FIG. 7, the embodiment 3 differs from the embodiment 1 is in that: the number of the convex strengthening structure 3 is two, the two convex strengthening structures 3 are respectively arranged on the two side edges of the first receiving hole 121 connecting with the arch foot of the arch structure 2, and the two convex strengthening structures 3 extend in a convex strip shape along the length direction of the fixing section 12, thereby reducing the numbers of the convex strengthening structure 3, while is also convenient to stamp the convex strengthening structure 3, and reducing the process time of the convex strengthening structure 3.

Embodiment 4

Figure 8:
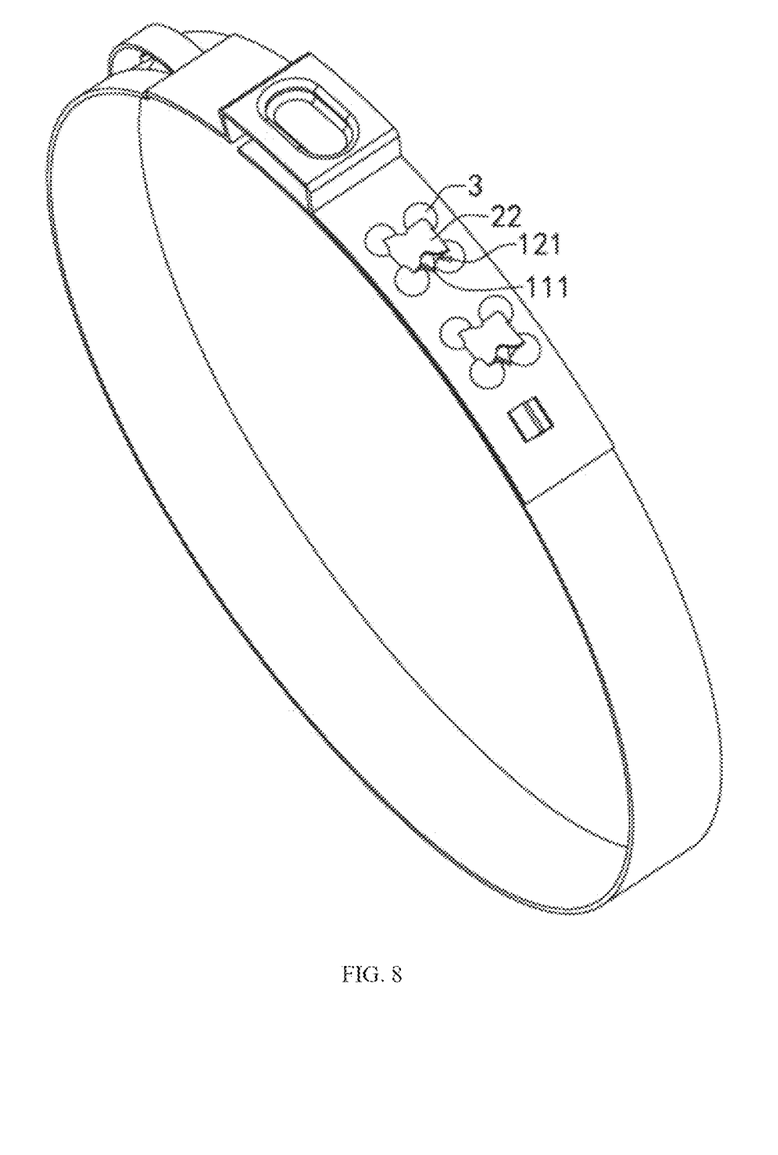
FIG. 8 is a schematic structure diagram illustrating an arrangement of the convex strengthening structure according to Embodiment 4 of the present application.
Figure 9:
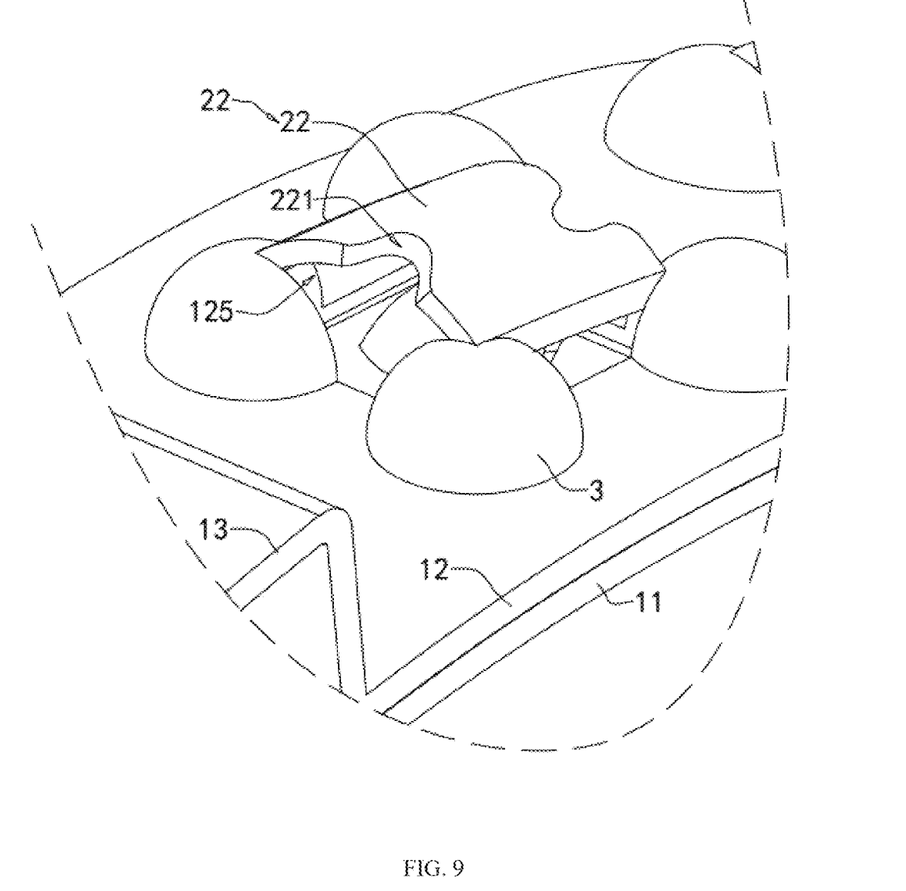
FIG. 9 is a partial enlarged view illustrating the processing opening and the narrowing notch according to Embodiment 2 of the present application.

Referring to FIG. 8, the embodiment 4 differs from the embodiment 2 is in that: the number of the convex strengthening structure 3 is four, and the four arch foots of the circular-arch part 22 are respectively located at the center of the four convex strengthening structure 3; and some hoops are relatively large in size, so that there is no necessary to give way to the first snap-hook 111 on some hoops with larger sizes, which the convex strengthening structure 3 can be directly arranged on the corner of the inner side edge of the first receiving hole 121, and more effectively reducing the stress concentration problem of the joint between the first receiving hole 121 and the arch structure 2.

The above are the preferred embodiments of the present application, which are not intended to limit the protection scope of the present application. Therefore, all equivalent changes made according to the structure, shape and principle of the present application should be wrap-shaped within the protection scope of the present application.

LIST OF REFERENCE SIGNS 1. hoop body
11. connecting section
111. first snap-hook
112. second snap-hook
113. fixing block
114. limiting strip
115. limiting slot
12. fixing section
121. first receiving hole
122. second receiving hole
123. abutting interface
124. fixing slot
125. processing opening
13. hooping section
2. arch structure
21. globular arch part
22. circular-arch part
221. narrowing notches
3. convex strengthening structure

What is claimed is:

1. An anti-tearing hoop, comprising:
    a hoop body,
    wherein the hoop body comprises a connecting section, a fixing section and a hooping section, the connecting section is provided with a first snap-hook and a second snap-hook, and the fixing section is provided with a first receiving hole and a second receiving hole, which are configured for insertion of the first snap-hook and the second snap-hook respectively;
    wherein, an arch structure is provided on a side, facing away from the connecting section, of the fixing section at the first receiving hole, an abutting interface is provided at a joint of the arch structure and the fixing section, the abutting interface is arranged on a side edge of the arch structure away from the hooping section, and a convex strengthening structure is provided on the fixing section at a corner of the arch structure; and
    wherein the arch structure is a circular-arch part, and a side edge of the circular-arch part closest to the hooping section is provided with a processing opening, and a narrowing notch is provided at each side of the circular-arch part closest to and away from the hooping section.

2. The anti-tearing hoop according to claim 1, wherein a number of the convex strengthening structures is four, and the four convex strengthening structures are respectively arranged at arch foots of the circular-arch part closest to the abutting interface and the processing opening.

3. The anti-tearing hoop according to claim 1, wherein a number of the convex strengthening structures is four, and four arch foots of the circular-arch part are respectively located at centers of the four convex strengthening structures.

* * * * *